US009377864B2

(12) United States Patent
Tullis et al.

(10) Patent No.: US 9,377,864 B2
(45) Date of Patent: Jun. 28, 2016

(54) TRANSFORMING VISUALIZED DATA THROUGH VISUAL ANALYTICS BASED ON INTERACTIVITY

(71) Applicant: Microsoft Corporation, Redmond, WA (US)

(72) Inventors: Steve Tullis, Redmond, WA (US); Uhl Albert, Kirkland, WA (US); David Gustafson, Boise, ID (US); Aaron Lamar Wilson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 243 days.

(21) Appl. No.: 13/887,702

(22) Filed: May 6, 2013

(65) Prior Publication Data

US 2014/0327608 A1    Nov. 6, 2014

(51) Int. Cl.
*G06F 3/01* (2006.01)
*G06Q 10/10* (2012.01)

(52) U.S. Cl.
CPC .............. *G06F 3/017* (2013.01); *G06Q 10/101* (2013.01)

(58) Field of Classification Search
None
See application file for complete search history.

(56) References Cited

U.S. PATENT DOCUMENTS

| | | | |
|---|---|---|---|
| 6,400,366 B1 * | 6/2002 | Davies et al. | 345/440 |
| 6,707,454 B1 | 3/2004 | Barg et al. | |
| 2006/0288284 A1 | 12/2006 | Peters et al. | |
| 2010/0312803 A1 | 12/2010 | Gong et al. | |
| 2011/0115814 A1 * | 5/2011 | Heimendinger et al. | 345/619 |
| 2013/0103677 A1 * | 4/2013 | Chakra et al. | 707/723 |

OTHER PUBLICATIONS

Heer, et al., "Interactive Dynamics for Visual Analysis", Retrieved at <<http://portal.acm.org/ft_gateway.cfm?id=2146416 &type=pdf>>, in Magazine—Microprocessors, vol. 10, Issue 2, Feb. 2012, pp. 26.
Elias, et al., "Exploration Views: Understanding Dashboard Creation and Customization for Visualization Novices", Retrieved at <<https://www.lri.fr/~anab/publications/EV.pdf>>, in Proceedings of the 13th IFIP TC 13 International Conference on Human-Computer Interaction—vol. Part IV, Sep. 5, 2011, pp. 18.
Perry, et al., "VizDeck: Streamlining Exploratory Visual Analytics of Scientific Data", Retrieved at <<https://www.ideals.illinois.edu/bitstream/handle/2142/36044/206.pdf?sequence=4>>, in Proceeding of iConference, Jan. 28, 2013, pp. 13.
Mackinlay, et al., "Show Me: Automatic Presentation for Visual Analysis", Retrieved at <<http://rogerking.me/wp-content/uploads/2012/01/infovis-paper-showme-vfinal.pdf>>, in Journal of IEEE Transactions on Visualization and Computer Graphics, vol. 13, No. 6, Nov. 2007, pp. 8.

(Continued)

*Primary Examiner* — Barry Drennan
*Assistant Examiner* — Jason Pringle-Parker
(74) *Attorney, Agent, or Firm* — Julie Kane Akhter; Jim Ross; Micky Minhas

(57) ABSTRACT

A data visualization application transforms visualized data through visual analytics. A detected gesture and associated visualization are processed through a visual analytics engine of the application. The visual analytics engine determines attributes for a new visualization based on the contextual information of the gesture and the visualization. The analytics engine dynamically builds an action based on the attributes. Execution of the action generates the new visualization which is rendered for presentation.

17 Claims, 7 Drawing Sheets

(56) References Cited

OTHER PUBLICATIONS

"International Search Report & Written Opinion for PCT Patent Application No. PCT/US2014/036723", Mailed Date: Aug. 4, 2014, Filed Date: May 5, 2014, 8 Pages.

Chapman, Don., "How to Make Data Visualization more Intuitive with Auto Charting", Retrieved at <<http://blogs.sas.com/content/sascom/2012/05/23/how-to-make-data-visualization-more-intuitive-with-auto-charting/>>, May 23, 2012, pp. 3.

* cited by examiner

TRANSFORMING VISUALIZED DATA THROUGH VISUAL ANALYTICS BASED ON INTERACTIVITY

BACKGROUND

People interact with computer applications through user interfaces. While audio, tactile, and similar forms of user interfaces are available, visual user interfaces through a display device are the most common form of user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render visual effects through a display and enable users to provide input associated with the applications' operations.

Modern platforms present data in textual form which is seldom combined with visual representations. In contemporary solutions data is usually presented to users in tables. Users select or define parameters for visualization of the presented data manually. Although, some portions of the data visualization are automated, such as ready-made charts, common data visualizations start with a user interaction. Subsequent data visualizations involve multiple user interactions with the data. Expansion of data analysis in the work place and personal lives necessitate elimination of manual user interactions while generating and updating data visualization for efficient utilization of data analysis.

Manipulation of visualized data is a source of additional difficulties associated with data visualization. In contemporary solutions, manual steps are needed in selecting visualization parameters (scale, axes, increments, style, etc.), range of data, and others. The manual aspects make data visualization counter-productive and counter-intuitive within the touch and/or gesture based intuitive and automated interaction environment of modern and future computing technologies.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to transforming visualized data through visual analytics based on interactivity. According to some embodiments, a data visualization application may display a visualization. The visualization may present data in visual form such as a graph, a chart, an information graph or similar ones. The application may detect a gesture interacting with the visualization. The gesture may include variety of input types including touch, pen, keyboard, mouse, eye-movement, visual, audio, and similar ones. The gesture and the visualization may be processed through a visual analytics engine to determine attributes for a new visualization. Visual analytics engine may determine a style, a format, a type, a dimensionality, and similar attributes for the new visualization based on contextual information determined from the gesture and the displayed visualization. Next, the application may generate the new visualization based on the attributes and present it for consumption.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
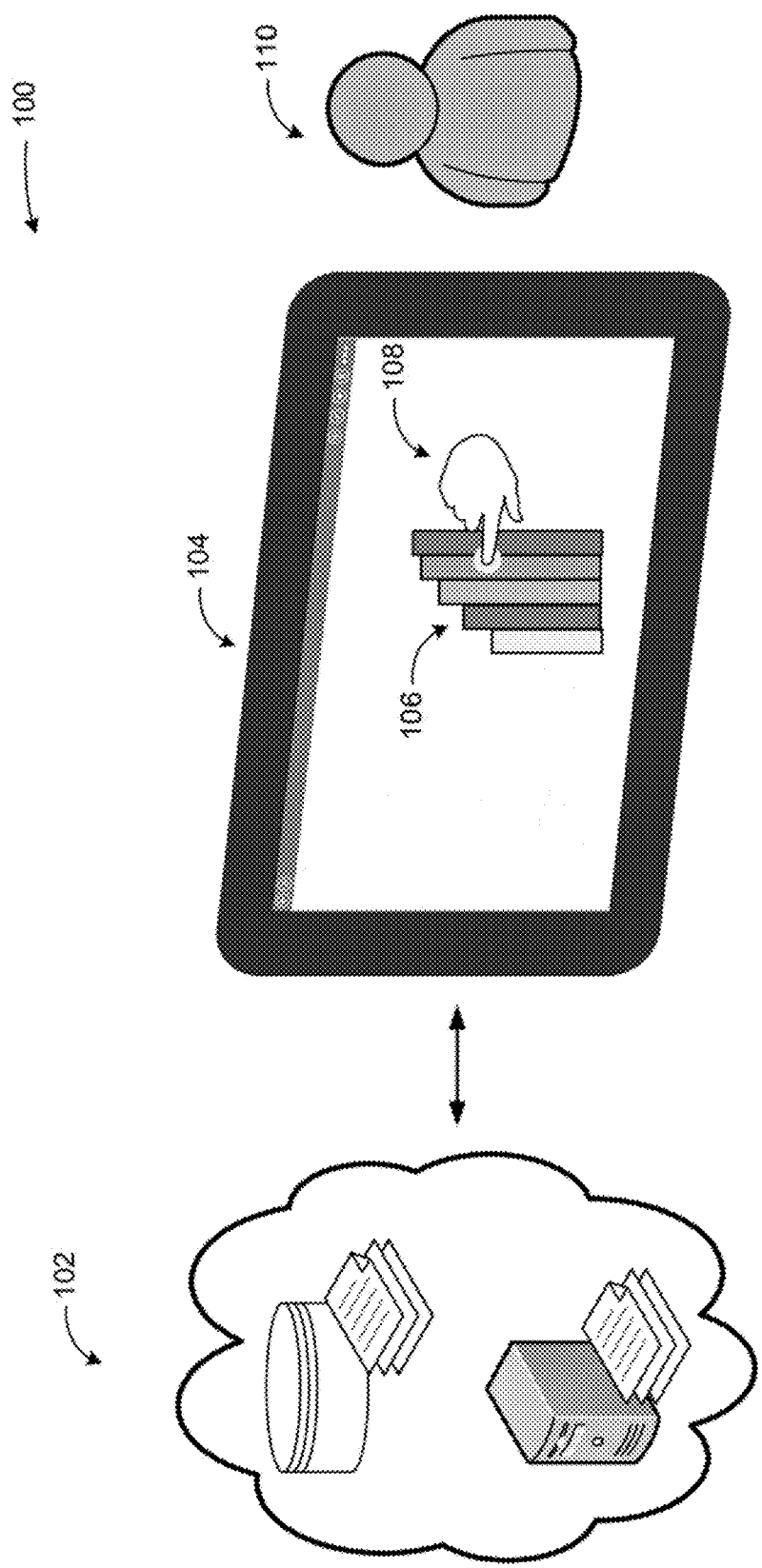
FIG. 1 illustrates an example concept diagram of transforming data through visual analytics based on interactivity according to some embodiments.

As briefly described above, visualized data may be transformed through visual analytics based on interactivity. A data visualization application may process a detected gesture and a displayed visualization through a visual analytics engine to determine attributes for a new visualization. The application may generate the new visualization based on the attributes and present the new visualization.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for transforming visualized data through visual analytics based on interactivity. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example concept diagram of transforming visualized data through visual analytics based on interactivity according to some embodiments. The components and environments shown in diagram 100 are for illustration purposes. Embodiments may be implemented in various local, networked, cloud-based and similar computing environments employing a variety of computing devices and systems, hardware and software.

A device 104 may display a visualization 106 to a user 110. The visualization 106 is displayed by a data visualization application presenting visualizations. The visualization 106 may be a graph, a chart, a three-dimensional (3D) representation, a graphic, an image, a video, an information graph, and comparable ones. The visualization 106 may be a presentation of underlying data. The data may be transformed in response to a user interaction with the visualization. An example may include a user providing a gesture 108 to combine, split, reduce, and expand the visualization 106. The visualization 106 and the gesture 108 may be processed with a visual analytics engine to generate a new visualization. In addition, the device 104 may recognize the gesture 108 through its hardware capabilities which may include a camera, a microphone, a touch-enabled screen, a keyboard, a mouse, and comparable ones.

The device 104 may communicate with external resources such as a cloud-hosted platform 102 to retrieve or update the visualization 106 and underlying data. The cloud-hosted platform 102 may include remote resources including data stores and content servers. The data visualization application may auto-generate the visualization from the retrieved data based on contextual information associated with a user and/or the data.

Embodiments are not limited to implementation in a device 104 such as a tablet. The data visualization application, according to embodiments, may be a local application executed in any device capable of displaying the application. Alternatively, the data visualization application may be a hosted application such as a web service which may execute in a server while displaying application content through a client user interface such as a web browser. In addition to a touch-enabled device 104, interactions with the visualization 106 may be accomplished through other input mechanisms such as an optical gesture capture, a gyroscopic input device, a mouse, a keyboard, an eye-tracking input, and comparable software and/or hardware based technologies.

Figure 2:
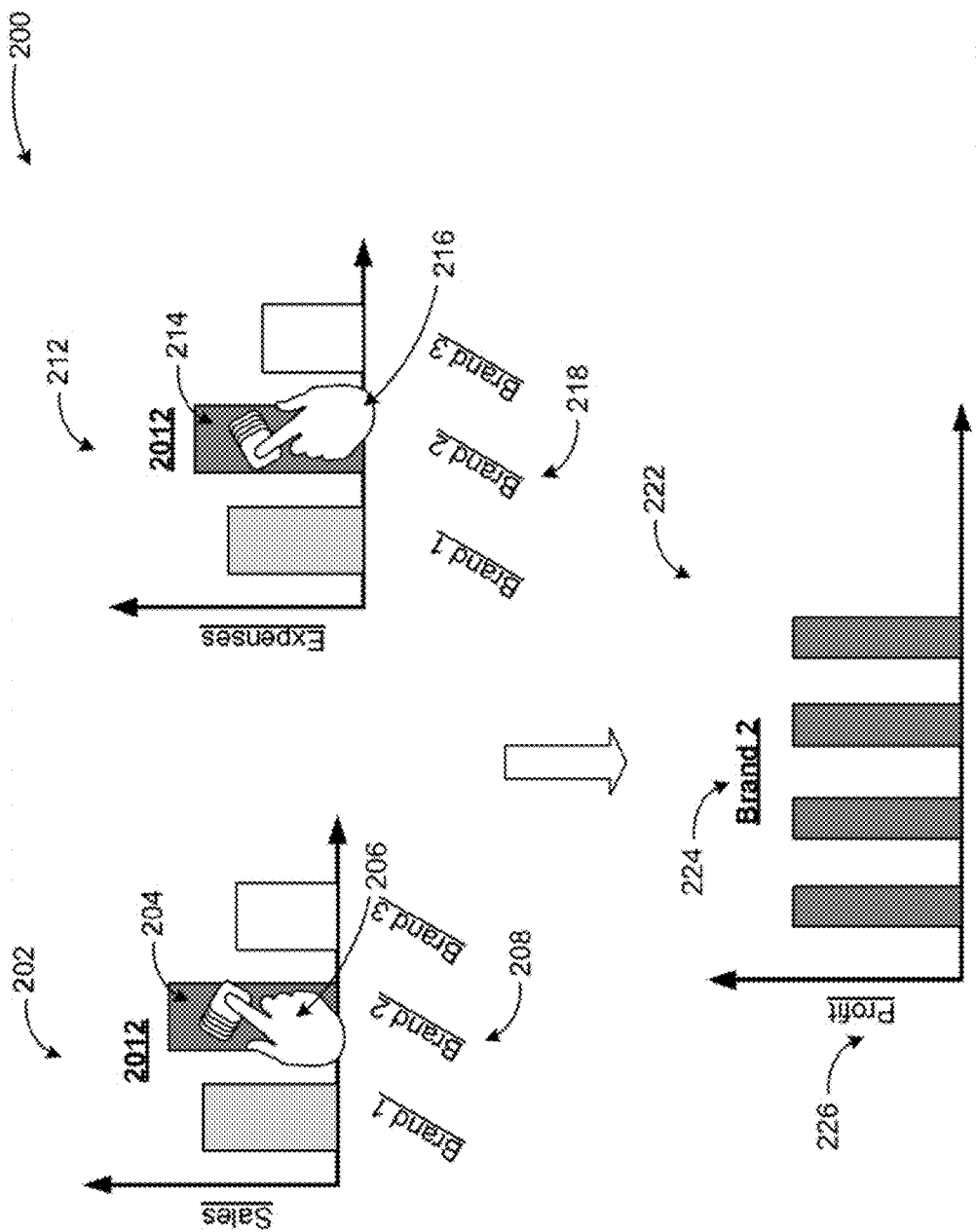
FIG. 2 illustrates an example of employing visual analytics to combine visualization elements of separate visualizations in a new visualization according to embodiments.

FIG. 2 illustrates an example of employing visual analytics to combine visualization elements of separate visualizations in a new visualization according to embodiments. Diagram 200 displays multiple gestures on visualizations which may be interpreted to combine portions of the visualizations.

The data visualization application may display the visualizations 202 and 212 together or in separate screens. The application may detect a gesture 206 on visualization 202 and a gesture 216 on visualization 212 while displaying the visualizations 202 and 212 together in a same screen. In addition, the gestures 206 and 216 may be detected concurrently. The gestures 206 and 216 may be interpreted to converge. The visualization analytics engine of the application may initiate a combine action on visualization 202 and 212 in response to converging gestures on the visualization elements 204 and 214.

Next, the visualization analytics engine may retrieve data elements associated with visualization elements 204 and 214. The analytics engine may combine the data elements. Data elements may be combined based on contextual information associated with gestures 206 and 216 and visualizations 202 and 212. Contextual information determination may be based on prior visualizations, user attributes, peer usage, organization rules, historical information, and similar ones. The analytics engine may evaluate the contextual information to a combine action. The combine action may be built dynamically based on the contextual information.

In addition, the analytics engine may determine attributes of the new visualization 222 based on the contextual information. The attributes may include style, format, type, dimensionality, and similar attributes of the new visualization including axes label 226. The analytics engine may integrate the attributes of the new visualization 222 into the combine action The combined action may be executed to generate the new visualization 222. Next, the application may render the new visualization 222 to present it. Alternatively, the new visualization 222 may be transmitted to an external resource (i.e., an external application) for presentation.

In an example scenario, the analytics engine may determine common attributes between the visualization elements 204 and 214 based on the contextual information. Common attributes may be used to determine attributes of the new visualization 222. In an example, the analytics engine may select label 208 and label 218 as a common attribute to use as a title 224 for the new visualization 222.

According to some embodiments, the analytics engine may select a default visualization type used by visualizations 202 and 212 for the new visualization 222. However, the analytics engine may compare a number of visualization elements (associated with the combined data elements) to a predetermined visual limit value to determine if the default visualization type is sufficient to display distinct visualization elements of the new visualization 222. If the number of the visualization elements is detected to exceed a predetermined visual limit value (defining capacity to display distinct visualization elements), then the analytics engine may replace the default type with another visualization type such as a line graph to represent the combined data elements in the new visualization 222.

Above examples of the analytics engine combining visualizations are not provided in a limiting sense. According to some embodiments, the application may interpret asynchronous gestures as converging gestures. The visual analytics engine may initiate a combine action based on a predetermined system setting or predetermined user setting associated with the asynchronous gestures.

Alternatively, the application may interpret gestures on separate screens displaying visualizations as converging gestures. The visual analytics engine may initiate a combine action similar to previous examples. In addition, screen selection for rendering the new visualization may be based on a default screen in focus while executing the application in a multiple screen environment. However, an alternate screen for displaying the new visualization may be specified by a predetermined system or user setting.

Figure 3:
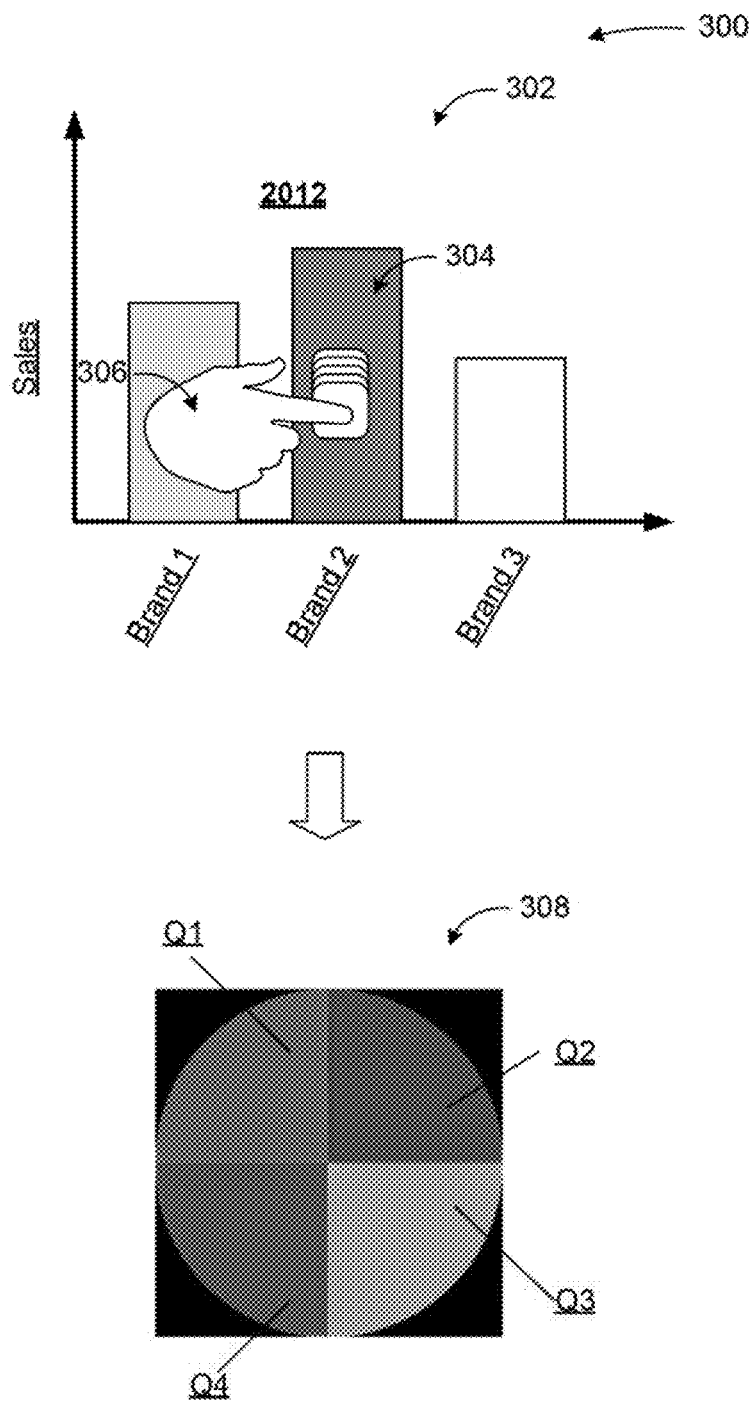
FIG. 3 illustrates another example of employing visual analytics to provide expanded presentation of a visual element in a new visualization according to embodiments.

FIG. 3 illustrates another example of employing visual analytics to provide expanded presentation of a visual element in a new visualization according to embodiments. Diagram 300 displays expansion of a portion of the visualization 302 in a different type of visualization in new visualization 308.

The data visualization may detect a gesture 306 to expand visualization element 304 of the visualization 302. The visualization analytics engine of the application may determine the gesture 306 to initiate an expansion action based on contextual information of the visualization 302 and the gesture 306. Contextual information determination may be based on prior visualizations, user attributes, peer usage, organization rules, historical information, and similar ones. The analytics engine may evaluate the contextual information to an expansion action. The analytics engine may dynamically build the expansion action based on the contextual information.

The analytics engine may determine attributes for the new visualization 308 including style, format, type, and similar ones based on the contextual information for the gesture 306 and the visualization 302. The attributes of the new visualization 308 may be integrated into the expansion action. The application may generate the new visualization 308 by executing the expansion action. Next the application may render the new visualization 308 for presentation. Alternatively, the new visualization 308 may be transmitted to an external application for presentation.

In addition, the analytics engine may select to utilize another type for the new visualization 308 than the visualization 302. The analytics engine may select new axis values, format, style, and similar attributes for the new visualization 308.

In another example scenario, a gesture may be interpreted as a reduction action on an element of a visualization based on contextual information determined using similar steps to the expansion action described previously. The visual analytics engine may determine new visualization attributes for a reduction action in similar steps as the previously described example for the gesture 306 initiating an expansion action.

Figure 4:
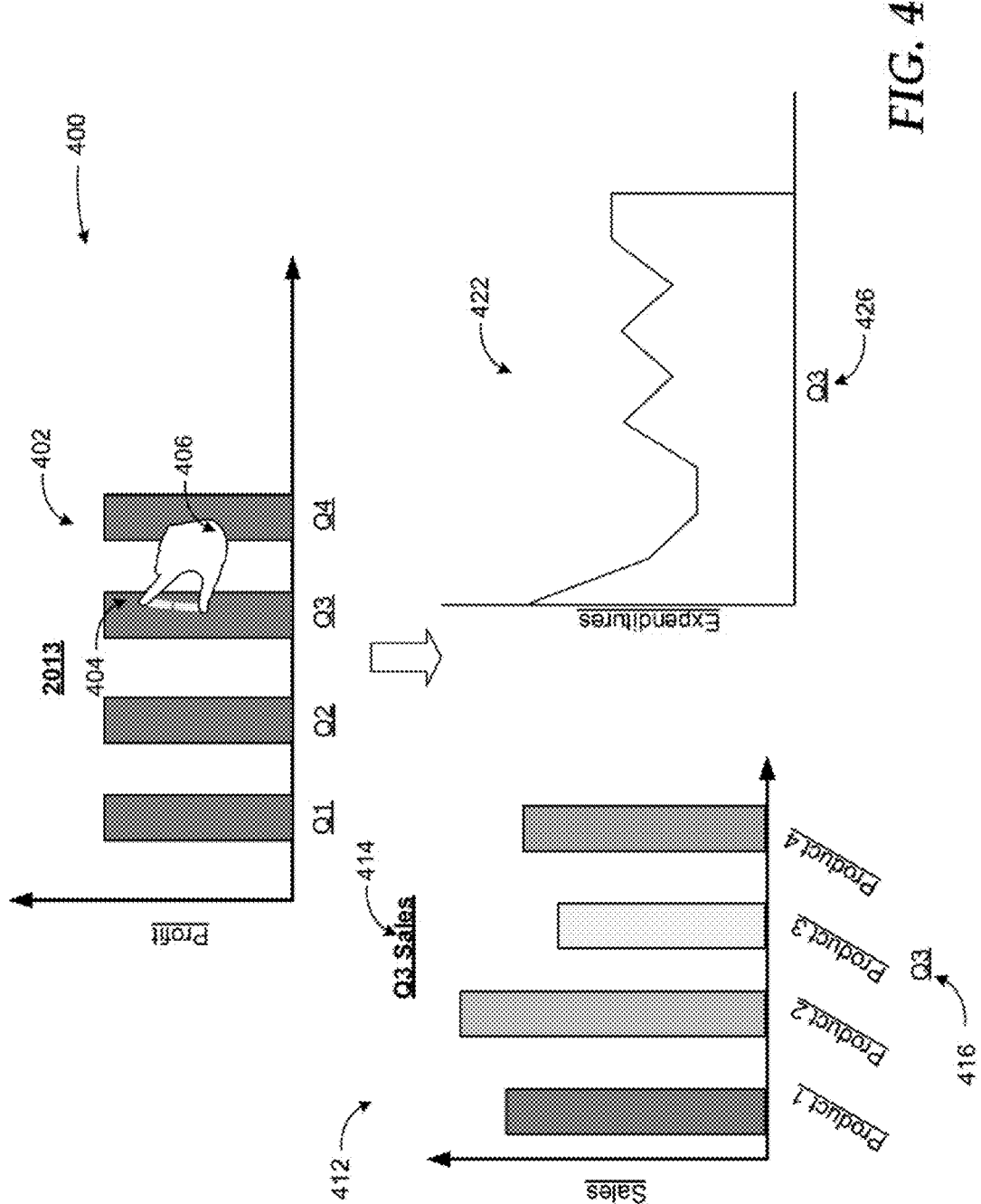
FIG. 4 illustrates another example of employing visual analytics to provide a split presentation of a visual element in new visualizations according to embodiments.

FIG. 4 illustrates an example of employing visual analytics to provide a split presentation of a visual element in new visualizations according to embodiments. Diagram 400 displays a gesture 406 initiating a split action to produce new visualizations 412 and 422.

The data visualization application may display visualization 402 as a bar chart of a data set. The application may detect a gesture 406 on a visualization element 404. The visual analytics engine of the application may match the gesture 406 to a split action based on contextual information of the gesture 406 and the visualization 402. Contextual information determination may be based on prior visualizations, user attributes, peer usage, organization rules, historical information, and similar ones. The analytics engine may evaluate the contextual information to a split action. The analytics engine may dynamically build the split action based on the contextual information. In addition, the analytics engine may determine attributes of the new visualizations based on the contextual information. The attributes may include style, format, type, and similar attributes of the new visualizations 412 and 422. The analytics engine may integrate attributes of the new visualizations 412 and 422 into the split action. Next the application may generate the new visualizations 412 and 422 by executing the split action. New visualization 412 may have a title 414 determined by the analytics engine from the contextual information associated with data elements of the visualization 402. A common axes label 416 and 426 may be determined by the analytics engine by analyzing the contextual information associated with visual element 404 and retrieving its axes label for use in the split action.

Embodiments are not limited to above described gestures examples. The visual analytics engine may evaluate number of gestures including a pinch action, a spread action, a tap action, tap and hold, drag and drop, a double tap, and similar ones to a combine, a split, a reduction, an expansion, and similar actions. In addition, gestures and corresponding actions may be applied to entire visualizations or portions of the visualizations. In other examples, displayed visualization may be updated by the dynamically built action instead of replacing with a new visualization. In an example scenario, the visual analytics engine may update a displayed visualization if the analytics engine dynamically builds an action that duplicates the attributes of the displayed visualization.

Embodiments are also not limited to automatically generating new visualization through visual analytics based on contextual information. Other embodiments may automatically suggest (auto-suggest) one or more actions if there is an inability of the visual analytics engine to determine an action associated with the gesture. The analytics engine may search history of prior actions to select actions related to the detected gesture as auto-suggest options. An auto-suggest component of the application may present action options as actionable graphic representations of potential new visualizations. Selection of any of the actionable graphic representations may execute the associated action and generate the new visualization. In addition, the style of the new visualization may be selected automatically by the visual analytics engine based on contextual information of the gesture and the visualization.

The example scenarios and schemas in FIG. 2 through 4 are shown with specific components, data types, and configurations. Embodiments are not limited to systems according to these example configurations. Transforming visualized data through visual analytics may be implemented in configurations employing fewer or additional components in applications and user interfaces. Furthermore, the example schema and components shown in FIG. 2 through 4 and their subcomponents may be implemented in a similar manner with other values using the principles described herein.

Figure 5:
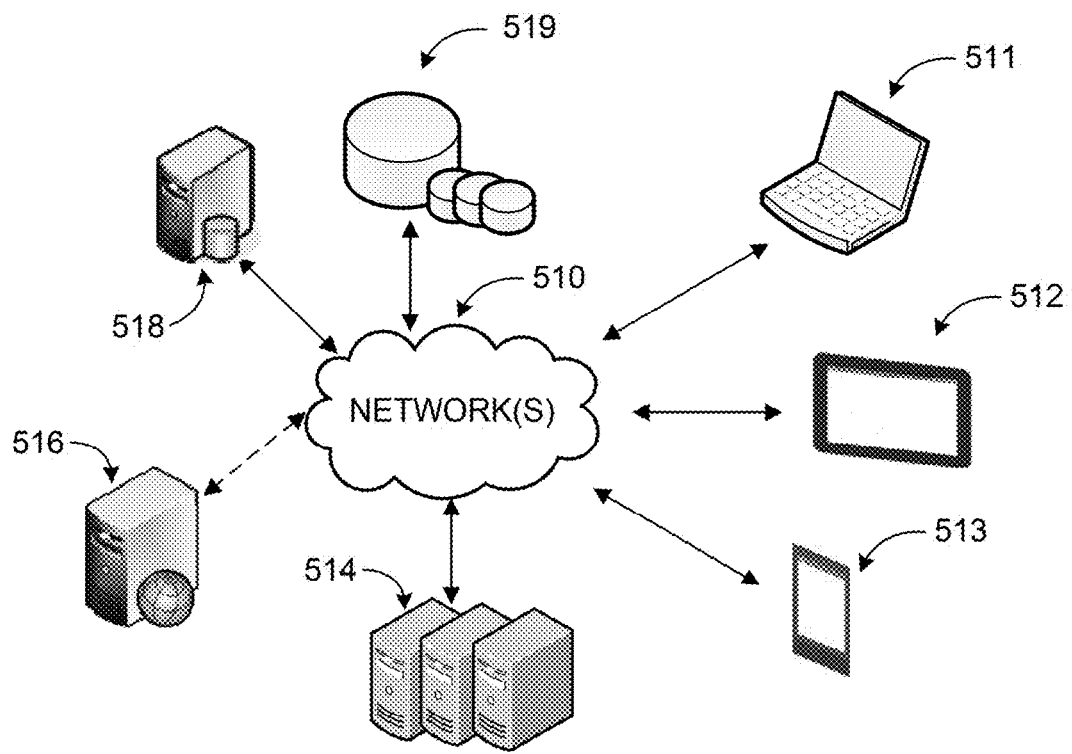
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may execute on individual computing devices such as a smart phone 513, a tablet device 512, or a laptop computer 511 ('client devices') and communicate with a content resource through network(s) 510.

As discussed above, a data visualization application may transform visualized data through visualized analytics based on interactivity. The application may process a detected gesture and the associated visualization through visual analytics engine to determine attributes for a new visualization. A visual analytics engine of the application may determine the attributes based on contextual information of the gesture and the visualization. The application may execute an action integrating the attributes and the contextual information to generate the new visualization. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data resources, and data distribution systems may be employed to transform visualized data through visual analytics based on interactivity. Furthermore, the networked environments discussed in FIG. 5 are for illustration purposes only. Embodiments are not limited to the example applications, modules, or processes.

Figure 6:
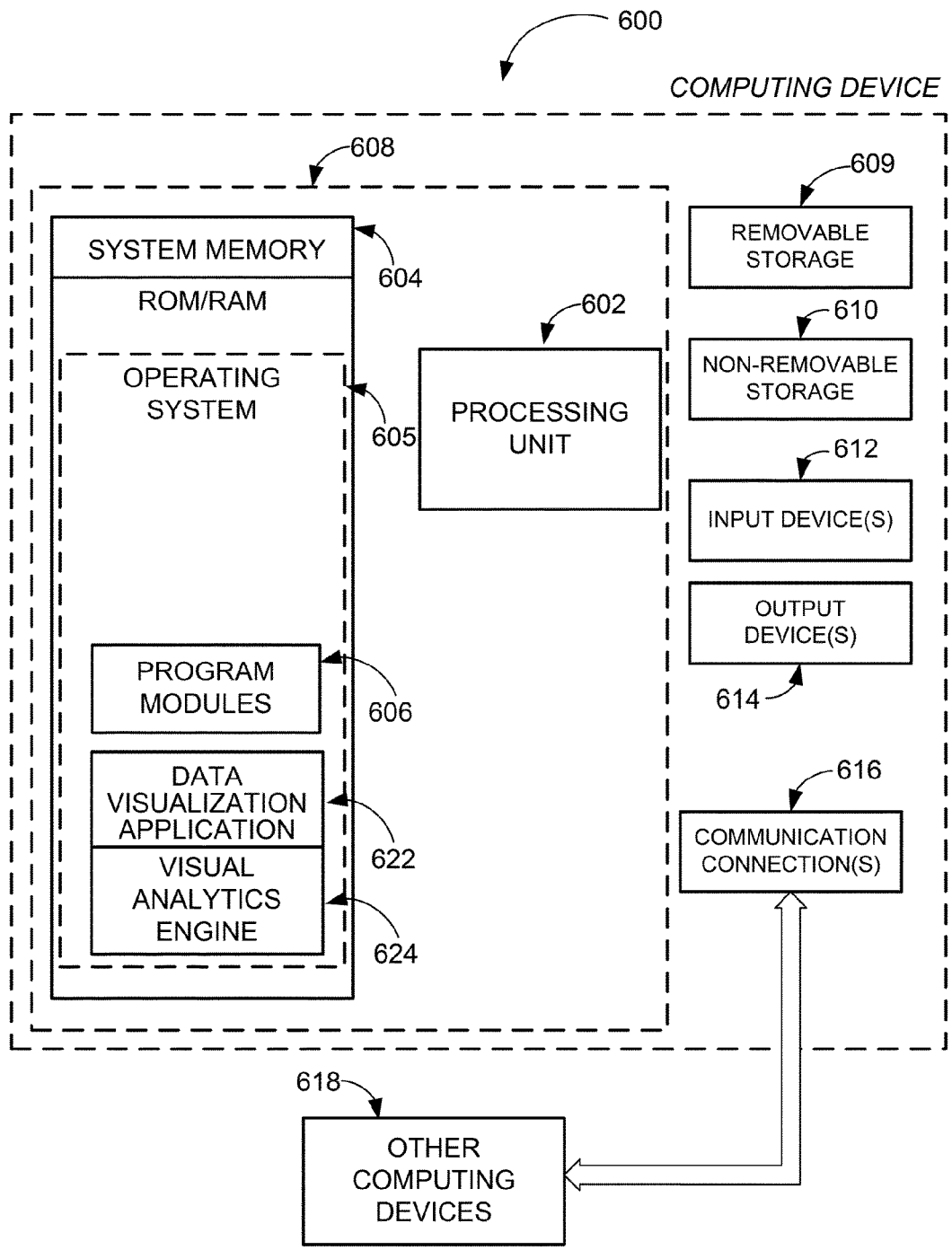
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, a data visualization application 622, and a visual analytics engine 624.

A data visualization application 622 may detect a gesture interacting with a displayed visualization. A visual analytics engine 624 of the application may determine attributes for a new visualization based on contextual information of the gesture and the visualization. The data visualization application 622 may execute an action integrating the attributes and the contextual information to generate the new visualization. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
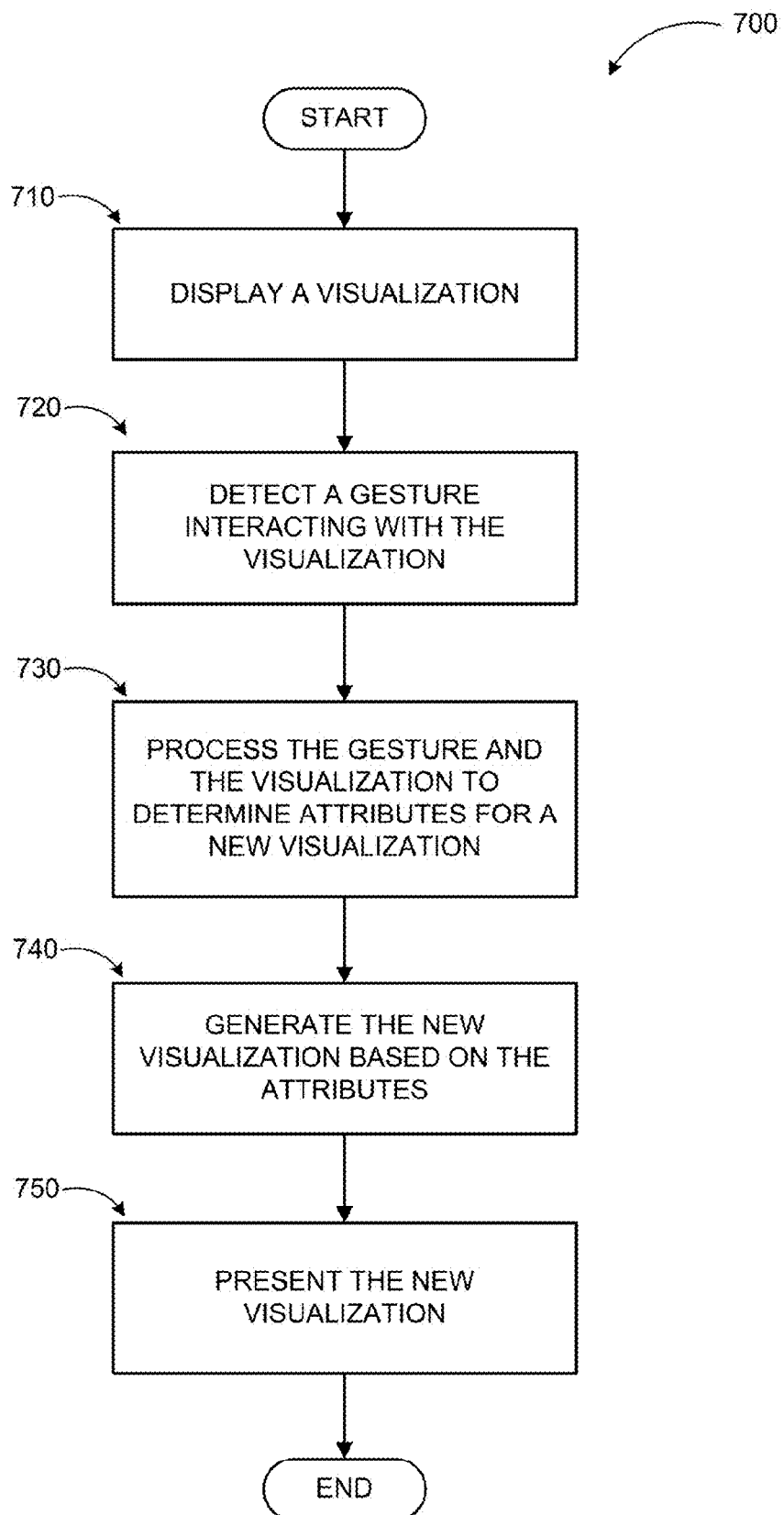
FIG. 7 illustrates a logic flow diagram for a process transforming visualized data through visual analytics based on interactivity according to embodiments.

FIG. 7 illustrates a logic flow diagram for a process transforming visualized data through visual analytics based on interactivity according to embodiments. Process 700 may be implemented by a data visualization application, in some examples.

Process 700 may begin with operation 710 where the data visualization application may display a visualization of data. The visualization may be a graph, a chart, and comparable ones of the data. At operation 720, a gesture may be detected in interaction with the visualization. The gesture may include a variety of input types including touch, keyboard, pen, mouse, visual, audio, eye tracking, and comparable ones. Next, the application may process the gesture and the visualization through a visual analytics engine to determine attributes for a new visualization at operation 730. The attributes for the new visualization may be determined based on contextual information of the gesture and the visualization.

The data visualization application may generate the new visualization based on the attributes at operation 740. The new visualization may have new style, format, type, and similar attributes. The new visualization may be presented at operation 750 by rendering at a display screen or transmitting to an external application.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Transforming visualized data through visual analytics based on interactivity, according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for transforming visualized data through a visual analytics engine based on interactivity, the method comprising:
    displaying, through a display device of the computing device, a visualization;
    receiving a gesture associated with a portion of the visualization through one of a surface of the display device or a camera attached to the computing device;
    processing the gesture and the portion of the visualization to determine attributes for a new visualization, wherein the attributes include a dimensionality, a style, a format, and a type;
    generating the new visualization based on the attributes;
    determining a contextual information associated with the gesture and the visualization based on prior visualizations, user attributes, a gesture history, and a visualization history;
    evaluating the contextual information to determine an action including one of: a combination, a split, an expansion, a reduction action;
    in response to a failure to identify the action,
        performing a search on a history of prior actions associated with the contextual information;
        determining a suggested action based on the history of the prior actions;
        presenting the suggested action as a graphical representation of a potential new visualization; and
        detecting a selection of the graphical representation of the potential new visualization to execute the suggested action and generate the new visualization; and
    displaying the new visualization through the display device employing the action.

2. The method of claim 1, further comprising:
    executing the action based on the contextual information.

3. The method of claim 2, further comprising:
    determining attributes of the new visualization based on the contextual information.

4. The method of claim 1, further comprising:
    integrating the attributes of the new visualization in the action.

5. The method of claim 4, further comprising:
    executing the action to generate the new visualization.

6. The method of claim 5, further comprising:
    assigning a new data type to underlying data associated with the new visualization based on types of underlying data selected on the visualization.

7. The method of claim 1, further comprising:
    selecting a default type as one of the attributes based on a type of the attributes associated with the visualization.

8. The method of claim 7, further comprising:
    comparing a number of visualization elements of the new visualization to a predetermined visual limit value; and
    replacing the default type with another type in response to detecting the number of the visualization elements of the new visualization exceeding the predetermined visual limit value.

9. A computing device for transforming visualized data through a visual analytics engine based on interactivity, the computing device comprising:
    a memory configured to store instructions; and
    a processor coupled to the memory, the processor executing a data visualization application in conjunction with the instructions stored in the memory, wherein the data visualization application is configured to:
        display a visualization;
        detect a gesture associated with a portion of the visualization;
        determine a contextual information associated with the gesture and the portion of the visualization based on prior visualizations, user attributes, a gesture history, and a visualization history;
        evaluate the contextual information to determine an action including one of: a combination, a split, an expansion, a reduction action;
        in response to a failure to identify the action,
            perform a search on a history of prior actions associated with the contextual information;
            determine a suggested action based on the history of the prior actions;
            present the suggested action as a graphical representation of a potential new visualization; and
            detect a selection of the graphical representation of the potential new visualization to execute the suggested action and generate the new visualization;
        execute the action based on the contextual information;
        determine attributes of a new visualization based on the contextual information, wherein the attributes include a dimensionality, a style, a format, and a type;
        integrate the attributes of the new visualization in the action;
        execute the action to generate the new visualization; and
        render the new visualization.

10. The computing device of claim 9, wherein the application is further configured to:
    detect another gesture on another visualization as concurrent and converging with the gesture; and
    evaluate the contextual information to determine a combine action.

11. The computing device of claim 9, wherein the application is further configured to:
  detect another gesture as asynchronous with the gesture; and
  evaluate the contextual information to determine a combine action.

12. The computing device of claim 9, wherein the application is further configured to:
  in response to a detection of another gesture displayed on a second screen, evaluate the contextual information to determine a combine action.

13. The computing device of claim 9, wherein the application is further configured to:
  select a default screen as the screen in focus to render the new visualization in an environment including a plurality of screens.

14. A method executed on a computing device for transforming visualized data through a visual analytics engine based on interactivity, the method comprising:
  displaying a visualization;
  detecting a gesture associated with a portion of the visualization;
  determining a contextual information associated with the gesture and a portion of the visualization based on prior visualizations, user attributes, a gesture history, and a visualization history;
  evaluating the contextual information to determine an action including one of: a combination, a split, an expansion, a reduction action;
  in response to a failure to identify the action,
    performing a search on a history of prior actions associated with the contextual information;
    determining a suggested action based on the history of the prior actions;
    presenting the suggested action as a graphical representation of a potential new visualization; and
    detecting a selection of the graphical representation of the potential new visualization to execute the suggested action and generate the new visualization;
  executing, the action based on the contextual information;
  determining attributes of a new visualization based on the contextual information, wherein the attributes include a dimensionality, a style, a format, and a type;
  integrating the attributes of the new visualization in the action;
  executing the action to generate the new visualization;
  selecting a default screen as a screen in focus to render the new visualization in an environment including a plurality of screens; and
  rendering the new visualization in the default screen to present the new visualization.

15. The method of claim 14, further comprising:
displaying elements on the visualization.

16. The method of claim 14, further comprising:
duplicating the attributes of the visualization while executing the action.

17. The method of claim 15, further comprising:
generating the new visualization by updating the visualization in response to duplicating the attributes of the visualization in the action.

* * * * *